June 10, 1969   C. J. KOESTER   3,449,037
FIBER OPTICAL IMAGE-ENHANCING DEVICES, SYSTEMS, AND THE LIKE
Filed March 14, 1966
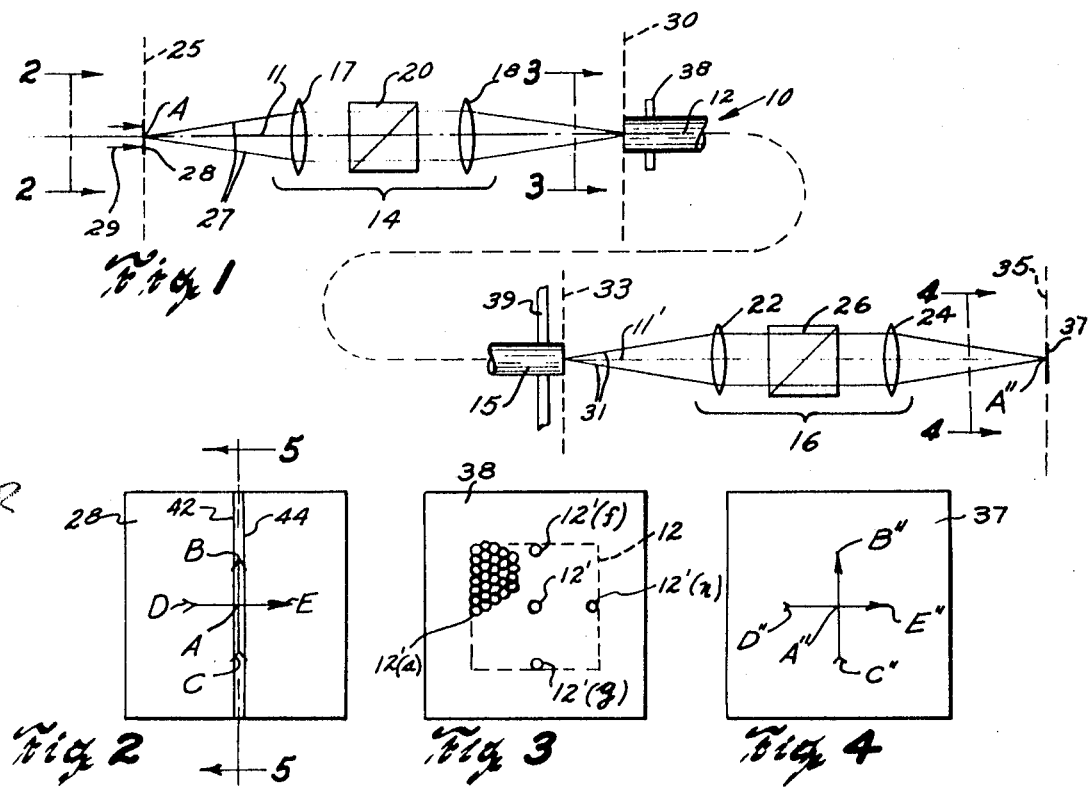
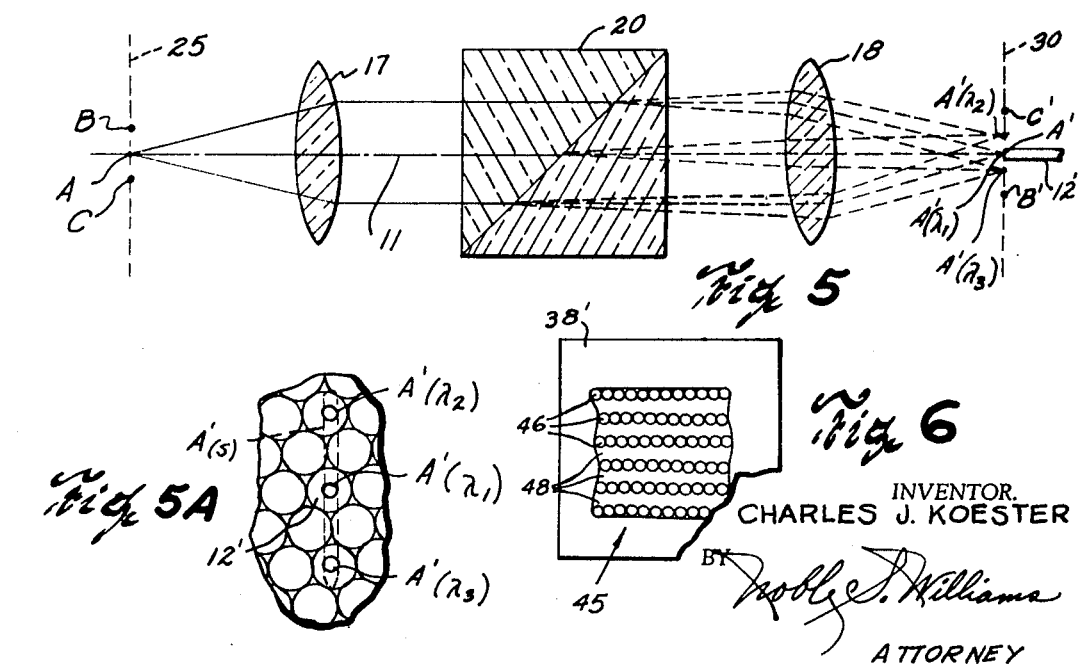
INVENTOR.
CHARLES J. KOESTER
BY
ATTORNEY

United States Patent Office 3,449,037
Patented June 10, 1969

3,449,037
FIBER OPTICAL IMAGE-ENHANCING DEVICES, SYSTEMS, AND THE LIKE
Charles J. Koester, South Woodstock, Conn., assignor, by mesne assignments, to American Optical Corporation, Southbridge, Mass., a corporation of Delaware
Filed Mar. 14, 1966, Ser. No. 534,214
Int. Cl. G02b 5/16
U.S. Cl. 350—96        3 Claims

ABSTRACT OF THE DISCLOSURE

Optical system employing fiber optical image-transmitting assembly and light-dispersing and image-forming means in fixed, spaced relation to the opposite end faces of said assembly for enhancing the resolution of two-dimensional full color images transmitted by said system.

---

This invention relates broadly to improved optical systems, and the like constructed and arranged to transmit two-dimensional images of improved quality from one location to another.

More particularly, the invention relates to optical image-transmitting devices, systems, and the like of improved construction and optical design and which employ in each instance as essential parts of the system a light-transmitting assembly or structure comprising a two-dimensional array of light-conducting channels or components capable of simultaneously transmitting in a range of spectral color, elemental bits of two-dimensional picture information, or the like, from an entrance area to an exit area thereof and a pair of light-dispersing relay systems aligned respectively with and oriented relative to said entrance and exit areas in such a manner as to enable two-dimensional images of improved optical quality and improved resolution, as compared with those which have been possible heretofore using comparable light-transmitting assemblies and structures, to be transmitted from one location to another thereby. Included within the meaning of the words two-dimensional "light-transmitting assemblies and structures" as used herein would be fiber optical image-transmitting bundles, both rigid and flexible, as well as multiple-channeled light-transmitting grids, screens and the like for conducting elemental bits of two-dimensional picture information or the like in various colors therethrough.

More specifically, the improved optical image-transmitting system employs a fiber optical bundle or an equivalent assembly, and adjacent an entrance area and also adjacent an exit are thereof, two light-dispersing relay systems each including light-dispersing means arranged in optical alignment, and with said bundle or assembly comprising a relatively large number of similar thin elongated light-conducting channels or components having their respective opposite end portions, at least, arranged in adjacent side-by-side generally parallel grouped relation to one another and in like geometric array, and in proper alignment with and in proper orientation relative to both of said relay systems. As will be explained hereinafter, modifications of the fiber optical bundle or multiple channel image-transmitting structure are possible.

A conventional fiber optical bundle, composed of a very large number of thin elongated light-conducting components (often referred to as fiber optical components) arranged in like closely packed array at their opposite ends, functions on the principle that each of these components will operate as a transparent "light pipe" or elemental transmission channel and conduct light from a different small part or spot in an object at the entrance end of the bundle to a corresponding small part or spot at the exit end of the bundle, and thus jointly these spots will produce a complete image of the object at the exit end of the bundle. While elongated components have here been referred to, it is pointed out that their particular length is not critical insofar as the instant invention is concerned. For good image resolution, however, it is essential that a very large number of light-conducting components be used and that each be relatively small in cross-sectional size.

However, difficulty has been experienced heretofore in obtaining as high quality and as high resolution in the transmitted image as might be desired due partly, at least, to the appearance of dark spots within the transmitted imaged caused by reduced transmittance or discontinuity in one or more of the elemental image transmission channels of the bundle, and also partly because of the grid-like or chicken-wire-like effect which appears in the transmitted image because of spaces between individual or groups of channels.

Also, it has been found that, under high image magnification, the relative positions of individual components of the bundle at the exit end relative to adjacent components at the same end can introduce distortions into the transmitted image and thus limit the degree of resolution which can be obtained therein.

In an endeavor to remove such objectional conditions and distortions from an image being transmitted, such as, for example, when a fiber optical bundle is being used, it has previously been suggested that the opposite ends of the bundle should be synchronously vibrated or synchronously rotated relative to the object to be transmitted and relative to the image receiving means. Such an arrangement, however, is far from satisfactory due at least in part to the need of additional equipment for producing such motion of the bundle ends and the means for effecting such synchronization.

It is, accordingly, an object of the present invention to provide a fiber optical image-transmitting system, or the like, comprising a fiber optical bundle or assembly comprising a very large number of thin elongated light-conducting components, arranged, at least adjacent their opposite end portions, in side-by-side closely bunched parallel relation to each other and in like geometric array, and a pair of similar light-relaying systems including image-forming and light-dispersing means arranged in aligned relation therewith and in proper orientation relative to the entrance and exit ends of the assembly, respectively, whereby two-dimensional images of improved quality, good color contrast and high resolution substantially free from any chicken-wire effect or the like may be transmitted thereby.

It should be appreciated, of course, that the bundle or assembly of like light-conducting components mentioned above, may be of any reasonable length desired and that the cross-sectional size of the ends of the bundle and that the cross-sectional size of the light-conducting components thereof (which in usual fashion comprise solid light-transmitting cores, such as glass or plastic, and of predetermined refractive index surrounded by solid transparent claddings of glass or plastic of lower refractive index) may be of any dimensions needed within a relatively wide range of sizes, but, of course, would be within keeping with the particular use to which said fiber optical image-transmitting system is to be put and whether or not a relatively rigid or fairly flexible assembly is desired.

Other objects and advantages of the invention will become apparent from the detailed description which follows when taken in conjunction with the accompanying drawings in which:

FIG. 1 is a diagrammatic showing of structure embodying the present invention;

FIG. 2 is an enlarged sectional view taken substantially upon section line 2—2 of FIG. 1 and looking in the direction of the arrows;

FIG. 3 is a sketch corresponding somewhat to a sectional view upon section line 3—3 of FIG. 1 for use in describing principles of operation of the invention;

FIG. 4 is an enlarged sectional view taken substantially upon section line 4—4 of FIG. 1 and looking in the direction of the arrows;

FIG. 5 is a longitudinal sectional view showing, materially enlarged, a portion of the structure of FIG. 1, in order to better explain principles of operation of the invention; same being taken upon section 5—5 of FIG. 2;

FIG. 5A is a sketch also for use in explaining said principles of operation; and FIG. 6 is a view similar to FIG. 3 but showing a modified fiber optical assembly.

Referring to the drawing in detail and in particular FIG. 1 wherein one embodiment of the invention for transmitting two-dimensional images is diagrammatically shown, it will be appreciated that a fiber optical bundle or assembly is indicated generally by the numeral 10 and that this assembly is disposed in the optical system so as to have its entrance end portion 12 arranged in optical alignment with a first light-relaying system 14 and its exit end portion 15 arranged in optical alignment with a second substantially similar light-relaying system 16. The fiber optical assembly 10, which preferably would be in most instances of square or nearly square cross-sectional shape (and which will be more fully described hereinafter), is not only aligned with but also suitably oriented relative to relay systems 14 and 16 at its opposite ends.

The relay system 14, it will be noted, comprises in alignment along optical axis 11 first lens means 17, chromatic dispersion and second lens means 18, said dispersion means being in the form of a direct-viewing prism 20. In like manner, relay system 16 comprises in alignment along optical axis 11' first lens means 22, chromatic dispersion means and second lens means 24, said dispersion means likewise being in the form of a direct-viewing prism 26. Thus, relay system 14, as indicated by light rays 27 in FIG. 1, is positioned and arranged so as to focus upon an object plane 25 and to form, in a general sense, an image of an object, such as object 28, at this location (illuminated by light rays 29) at image plane 30. Image plane 30 is, in fact, coincident with the entrance end face of assembly 10. In like manner, relay system 16, as indicated by light rays 31, is positioned and arranged so as to focus upon an object plane 33 coincident with the exit end face of the assembly 10 and to form, in a general sense, an image of the light received therefrom at a conjugate image plane 35. A viewing screen 37, or the like, may be disposed at image plane 35 for receiving and displaying such images, or an eye lens or a camera could be focused insted upon this image plane. Also opaque plates 38 and 39 are shown for supporting the opposite ends of assembly 10 in proper positions.

FIGURES 2 and 4 are enlarged sectional views taken substantially upon section line 2—2 and section line 4—4, respectively, in FIG. 1 and FIG. 3 is a sketch corresponding somewhat to a sectional view upon section line 3—3 of FIG. 1. FIG. 2 shows an illuminated object in the form of a target 28 having two arrows BAC and DAE in crossed relation as a pattern thereon, the two-dimensional image of which is to be transmitted by the improved optical system of the present invention from object plane 25 to image plane 35.

FIG. 3 shows supporting plate 38 and in dotted outline the more or less square end of the fiber optical bundle or assembly 10 carried thereby. Such a bundle would comprise, in known fashion, a very large number of similar thin elongated light-conducting components (each having a high refractive index transparent core surrounded by a lower refractive index cladding) disposed, at least adjacent their opposite end portions, in side-by-side bunched relation to one another so as to form entrance and exit end faces for the bundle, and with the said components at their opposite ends being arranged in like geometric array. Thus, it will be see that assembly 10 comprises, adjacent its entrance end, a relatively large number of thin elongated light-conducting components including, for example, components 12'(a), 12', and 12'(n) which are laterally spaced relative to each other and also 12'(f) and 12'(g) which are vertically spaced relative thereto. These light-conducting components at their exit end portions would also be similarly disposed and arranged in like geometric array. However, intermediate their opposite ends, the light-conducting components may or may not be so arranged, particularly if flexibility in the bundle or assembly 10 is desirable.

FIG. 4 is intended to show a two-dimensional image of the pattern BAC and DAE as transmitted by the improved fiber optical system to the image plane 35 and as received upon viewing screen 37 at this location, same being indicated at B"A"C" and D"A"E".

In order to better describe the principles of operation of the invention, FIG. 5 shows, in longitudinal section and appreciably enlarged, the first light-relaying system 14 of FIG. 1. If, for the moment, it is imagined that prism means 20 has been omitted from this relaying system 14, it will be appreciated that under such conditions, lens means 17 and 18 together would image axial object point A at axial image point A'. Note that the light rays travelling between these two lens means is substantially "parallel light," and that this image would be formed upon the entrance end face of light-conducting component 12'. It follows, of course, that vertically spaced points B and C would likewise form images at image plane 30 but at points B' and C' below and above image point A' respectively.

In FIGURE 5, however, when prism means 20 is present in the relay system 14 also comprising means 17 and 18, not only will the light rays from a polychromatically illuminated object point A in the object plane 25 be re-imaged by said lens means substantially at image plane 30 but, furthermore, each of the various different wavelengths of this illumination from point A will be at the same time differently refracted by prism means 20 and thus differently dispersed by the time they reach image plane 30. Accordingly, instead of a single polychromatic image of point A being formed at image point A', an image of point A in each different color or wavelength of the polychromatic illumination will be formed at image plane 30 and these different colored images will be somewhat differently vertically located relative to one another at image plane 30 in accordance with the refractive and dispersive characteristics of the prism means 20. In fact, this light from object point A will be formed into a line spectrum of these colors at image plane 30.

It follows that if object point A is, for example, illuminated by white light, this white light will be directed by lens means 17 as substantially parallel light toward prism means 20 and will be dispersed thereby into its component colors or wavelengths. Thereafter, the light of each different wavelength will be focused by lens means 18 at a slightly different vertically displaced location in image plane 30. Thus, yellow light from point A of a wavelength ($\lambda_1$), for instance, may be so deviated by prism means 20 and re-imaged by lens means 18 as to form a yellow image of A substantially at image point A'($\lambda_1$). (See also FIG. 5A.) However, at the same time, the red component of this white light from point A and at a wavelength ($\lambda_2$) may be so deviated by the prism means 20 and re-imaged by lens means 18, as indicated by dotted lines, as to form a red image of A at image point A'($\lambda_2$). Likewise, the blue component of this white light form object point A and of a wavelength ($\lambda_3$) may be so deviated by prism means 20 and re-imaged by lens means 18, as indicated by dotted lines, as to form a blue image of point A at image point A′(λ₃).

It will immediately be appreciated that, due to the prism means 20 in the path of the light rays coming from object point A, all of the images of A being formed in the various different component wavelengths will be differently deviated but will be adjacent one another and thus will appear as an elongated spectrum of colors as indicated by dotted outline A′(S) in FIG. 5A at image plane 30.

Even though only a narrow band of wavelengths (λ₁) of yellow light from object point A will enter the light-conducting component 12′ of the fiber bundle and the other wavelengths, such as A′(λ₂) and A′(λ₃) will be focused at image plane 30 above and below this component 12′ and thus will enter other components or channels, nevertheless, it follows that other illuminated points in the object plane 25 in the same vertical plane, such as points B and C (see also FIG. 2) will be, at the same time, contributing illumination through the relay system 14 in such a manner as to have each of these points not only imaged at the image plane 30 but also have the different wavelengths thereof dispersed by the prism means 20 into a spectrum of image points of different colors. Of course, each of these spectrums will be vertically offset relative to the spectrum formed by light from point A. The result will be, however, that light of a narrow band of wavelengths from point B and a different narrow band from point C, for example, will impinge upon the entrance end of the light-conducting component 12′ and will be simultaneously conducted thereby. The physical width of such a narrow band of wavelengths will depend upon the transverse dimension of the entrance end of the elemental image-conducting component or channel 12′ and the wavelengths within this band will depend upon the amount of dispersion provided by the prism means employed.

If reference is now again made to FIG. 2, it will be seen that, for discussion, two closely spaced vertical reference lines 42 and 44 are shown. Note that FIG. 5 is a longitudinal sectional view which lies substantially between these two lines. For the discussion which follows, it will be convenient to consider that the spacing between these two lines 42 and 44 has been chosen so as to just equal the transverse dimension of the image of the end face of light-conducting component 12′ of FIG. 3, when projected back through the relay system 14 to object plane 25 and onto the object 28. Thus, that for each differently vertically displaced object point B, A, C etc. (within the narrow strip indicated between parallel lines 42 and 44) only a small part of the spectral image light therefrom will impinge upon and will be transmitted by a light-conducting component, such as light-conducting component 12′. (The remainder, however, will enter other components, above or below.) Nevertheless, each of such vertically displaced components will be simultaneously transmitting light from other nearby object points within this narrow vertical strip, such as from points forming parts of arrow BAC in FIG. 2; and this will be so notwithstanding the fact that such differently vertically located object points contributing light simultaneously to such a component will be, in fact, contributing light of different narrow wavelength bands.

Thus, in effect, each light-conducting component of the assembly (like component 12′) will be simultaneously transmitting one elemental bit of picture information in one color or narrow band from one small object area, a second elemental bit of picture information in a different color or narrow band from a second small object area vertically offset from the first, and so forth; and with the total amount and character of such picture information which is transmitted in elemental bit form and in various different colors from a plurality of small vertically offset object areas by any single selected component being dependent upon the degree of dispersion provided the light at the entrance end of the component and the number of vertically arranged components at the entrance end of the assembly which would normally receive such dispersed light from a single object point.

It is important to note that each of these different transmitted bits of picture information in various different colors can be later separately retrieved and re-combined in their proper relative positions to each other in the reconstructed transmitted picture at the exit end of the system by suitable refracting and dispersing means which will be presently more fully described.

The combining of a number of these elemental bits of picture information, all representing the same small picture area but in different colors and transmitted by different light-conducting components, at one small final image area, results in a reconstitution of that area of the picture in essentially the same color values and intensities as it had originally. It should be noted, furthermore, that if one of these light-conducting components or channels, for instance, becomes broken, the particular bit of picture information from any object area which would have otherwise been carried in a certain color by this component to the image area, will only amount to a small fractional part of the total information from said object area; the much greater part being carried in other colors and by many other light-conducting components in adjacent relation thereto. Thus, when these transmitted bits are being re-combined at the exit end of the system, they will form the picture image area in substantially the color values and intensities of the original; the slight amount of light lost due to the broken component being substantially un-noticed. Even if a relatively extensive breakage of components or fibers in a fiber bundle occurs, the effect upon the transmitted image will not ordinarily be noticeable.

From FIG. 3, it will be clear that many similar light-conducting components, such as 12′(f) and 12′(g) are also contained in the same vertical plane which contains component 12′ and, accordingly, it should be kept in mind that each will receive dispersed light from points in the object field in substantially the same manner as component 12′.

The object pattern at 28 in FIG. 2 is two-dimensional and contains also horizontally-extending arrow DAE. Since the assembly 10 also comprises many small light-conducting components arranged, as indicated in FIG. 3, in laterally spaced relation to component 12′, it should be readily appreciated that each individual one of these laterally spaced light-conducting components such as at 12′(a) and 12′(n) may be thought of in a like manner but with each lying in a different longitudinally-extending vertically disposed plane through the relay system 14. Thus, each individual laterally spaced component will, in a similar manner, conduct light received from a correspondingly laterally offset vertically extending strip or portion of object field 28.

The exit end portion 15 of the light-conducting components of the assembly, as already pointed out, are arranged in like geometric array. Accordingly, since relay system 16 is similar to the already-described relay system 14, the exit ends of the light-conducting components of assembly 10 will be imaged thereby at image plane 35. At the same time, the various wavelengths of light transmitted through the components will be similarly dispersed by prism means 26.

Thus, when the relay system 16 is properly oriented as to its dispersion relative to the light-conducting components at exit end 15, so that the dispersion of the prism 26 is in properly oriented relation to the already-dispersed light travelling through the bundle, this dispersed light at the exit end 15 of the assembly 10 will be imaged by lens means 22 and 26 at image plane 35 and, at the same time, it will be re-combined by the prism means 26 with the result that a "white light" image of the object will be formed.

This may be more readily appreciated, if it is kept in mind that the yellow light of wavelength $\lambda_1$ from object point A in FIG. 5 is being conducted to the exit end of the assembly 10 by component 12', that the red light of wavelength $\lambda_2$ from the same point is being conducted by a different component disposed somewhat above component 12' and that the blue light of wavelength $\lambda_3$ from the same point is being conducted by a different component disposed somewhat below component 12'. However, in much the same way as discussed already relative to FIG. 5, these components of the white light from point A may be considered as imaged by the lens means 17, 18 at final image plane 35 and, at the same time, the red, the yellow and the blue light from point A will be refracted differently by the prism means 26 with the result that same will be brought together or into coincidence at the final image plane 35 and will form in full color values at axial image point A" a picture image which is the substantial equivalent to that of object area A.

When the prism means 20 has been positioned in fixed relation to the entrance end of the assembly or bundle 10, it may then be considered that there is only one orientation of the prism 26 relative to the exit end of the assembly 10 which will be the best position for full color image transmission therethrough; and thus if prism 26 is at such a time rotated about the axis 11' to any other position, the system will not provide as good results.

Accordingly, when the prism 26 is in its proper position relative to the exit end of the bundle 10 to receive the dispersed light therefrom and in accordance with the manner in which this dispersed light entered the entrance end of the bundle 10, a two-dimensional "white light" image, such as shown by vertical arrow B"A"C" and horizontal arrow D"A"E" in FIG. 4, will be formed and this transmitted image will be of improved optical quality and improved definition, as compared to images transmitted by conventional fiber optical bundles of like dimensions and like fiber size, and this transmitted image will have substantially full color contrast. Since every part of the final image is formed by light traversing a plurality of fibers or components, an averaging effect is produced and such things as individual broken components in the bundle will have no more than an insignificant effect thereupon. Also, the lines of demarcation between fibers or components in the final image will substantially disappear while the individual object lines in the transmitted image will look smooth, continuous and more natural at all locations, when compared with the same object lines when transmitted by a conventional fiber optical bundle.

While prims means 20 and prism means 26 have been mentioned as the light-dispersing means for the first and the second light-relaying systems 14 and 16, respectively, it should be noted that either or both of these means could be replaced, if desired, by other light-dispersing means such as a diffraction grating or the like. Also, while the image-forming means of relay system 14 (and likewise of relay system 16) has been described above as comprising two spaced lenses with "parallel light" between, and same is preferred construction (and was used herein since same had advantages in presenting a clear explanation of the principles of operation of the invention), nevertheless, it should be understood that a single image-forming lens adjacent the dispersion prism may be employed instead in either or both relay systems, if desired, with very acceptable results.

Even though an image-transmitting optical system which employs a full bundle of light-conducting components at its entrance and exit ends has already been discussed as a preferred embodiment in the invention, it would be possible to provide a modified form of the invention wherein a picture image may be transmitted by an assembly of less weight and of smaller size intermediate its opposite ends. Instead of using a full bundle of light-conducting components, a limited number of flat ribbon-like layers of light-conducting components secured together in spaced relation to one another at the opposite ends of the bundle are used. Preferably, the spacing between layers would be such as to enable several different components of different layers to simultaneously collect different wavelengths of light from the same single object point, and also the arrangement of the layers and the arrangement of the light-conducting components thereof at the opposite ends of the bundle would be in like geometric array. Thus, a more economical bundle of less weight, less size intermediate its ends and more flexibility could be obtained.

For example, in FIG. 6, the entrance end of a modified bundle is shown at 45 and comprises six layers 46 of components arranged in spaced vertically stacked relation to one another; same being held in such spaced relation by opaque layers 48 of an epoxy cement or the like. The end of the bundle, in turn, is shown supported by a supporting plate or the like 38'. Obviously, the opposite ends of such a bundle would be similarly arranged.

Thus, an arrangement of suitable cross-sectional area and using 5, 6, 7 or more spaced layers could be disposed so that from any selected point in the object field, the different layers thereof will receive different component colors of the dispersed image-containing light transmitted by the first relaying system. This dispersed light would then be transmitted through the bundle, emitted at the exit end thereof and re-combined by the second relaying system so as to form the final image. A modified fiber bundle of six layers each employing 1,000 light-conducting components, for example, would be much more economical to manufacture than would be a bundle containing 1,000 layers each contaning 1,000 components. Also, in connection with the arrangement of groups of fibers in FIG. 6, it is preferred to have the different groups staggered slightly relative to one another so that the corresponding individual light-conducting components of the different layers will not be vertically aligned with one another.

It is evident that a fairly large amount of the incident light at the entrance end of such a modified bundle would be lost, or, more exactly stated, unused, and that the final image will not appear as bright as before. Nevertheless, image resolution and color contrast would still be of acceptable quality, and the economy resulting from the use of such an "abbreviated" bundle, on the other hand, might very well be desired in certain instrumentation or the like. Also, insofar as an optical system employing such a modified bundle is concerned, individual broken light-conducting components will have only a minor detrimental effect upon the total amount of available light at any single point in the final image. Also, the chicken-wire effect mentioned previously will have disappeared.

It is clear from the preceding description that full uninterrupted two-dimensional images with good color contrast can be transmitted by the improved optical systems of the present invention even though the light-conducting components thereof are not always arranged in immediately adjacent relation to one another. It is here pointed out, furthermore, that a fiber optical bundle could, in fact, have the individual light-conducting components thereof at its opposite ends spaced somewhat in all directions from one another and this spacing could be more or less of a random spacing and same would function satisfactorily in transporting the image-containing light from one end thereof to the other as long as the spacing between adjacent components is not too great. To function satisfactorily, the dispersed wavelengths from each different point in the object field should be received in several different colors by at least several different light-conducting components. Of course, the light-conducting components at one end of the bundle should have the same geometric array as those at the opposite end thereof. Even though as much as 50% or even 75% of the total light impinging upon the entrance end of such a bundle would be at times unused, nevertheless, the remainder would be sufficient to provide a satisfactory image of less intensity but in color contrast and good resolution at the final image plane.

The dispersion means shown in the light-relaying systems of FIGS. 1 and 5 are in the form of direct view dispersion prisms 20 and 26. A diffraction grating could be used in the place of either of these prisms, if desired. However, an even better light-dispersing arrangement for some purposes might be when the light-relaying system is provided with both a diffraction grating and a prism arranged in proper alignment so as to function together. The grating would be arranged to first receive and diffract a part of the image-containing light rays into a first order spectrum of colors and the prism would be disposed so as to receive this spectral light and provide a further dispersion of the wavelengths thereof. A reason why a better dispersion could be obtained in this manner is due to the fact that within the first order spectral light from the grating the red wavelengths would be deviated the most and the blue and violet wavelengths would be deviated the least. Just the opposite is true insofar as the refracted wavelengths from the prism are concerned; and thus together a greater spectral distribution can be obtained thereby while the deviations tend to offset each other.

It has been found advisable, when using fiber optical bundles which have their individual components arranged in symmetrical patterns or rows such as is suggested by the components in FIG. 3, and thus tend to have definite lines of demarcation appear between adjacent rows of components in the transmitted image, to orient the ends of the bundle in such a manner as to have these lines angularly arranged, such as at 45°, relative to the direction of the dispersion of the light being transmitted thereby. When such is the case, streakedness, and the like, in the background of the transmitted light image will be minimized.

In the light-relaying systems 14 and 16 of FIG. 1 described above, positive spherical lenses have been indicated at 17, 18, 22 and 24 for re-imaging the light rays transmitted thereby. While the lenses of each relay system have been shown as bi-convex lenses, it is evident that plano-convex lenses could be used instead and could even be placed with their plano surfaces adjacent and cemented to the entrance and exit faces of the prism means, if desired. In fact, it would even be possible to actually form such convex lens surfaces directly upon the opposite faces of the prism means, if desired, and obtain equivalent color-dispersing and image-forming results for the relay system as those already described above.

Fiber optical image-transmitting bundles and the like which have the individual light-conducting components or light channels thereof tapered are known and have been used for magnifying or minifying the optical images transmitted thereby, and even, at times, have had their entrance and/or exit end surfaces spherically curved to better face and fit the curvature of field of a lens system or the like associated therewith. Obviously, the individual light-conducting channels or components of such a tapered structure or bundle are not exactly parallel to one another but are, nevertheless, and in a more general sense parallel to adjacent components thereof and while still having their opposite ends in like geometric array. It should be appreciated that the improved invention disclosed herein may be employed successfully with said bundle or structure having many tapered light paths.

Having described my invention, I claim:

1. An optical system for transmitting in full color contrast two-dimensional optical images from an object plane to a final image plane materially spaced therefrom, said optical system comprising a first light-relaying system, a fiber optical assembly and a second light-relaying system disposed in optical alignment, said assembly comprising a relatively large number of thin, elongated light-conducting components having their respective opposite end portions arranged in adjacent side-by-side parallel relation to one another and in like geometric array so as to provide similar bundle-like formations at opposite ends of said assembly having appreciable height and width, said components at each end of said assembly having optically finished end surfaces disposed in a common transverse plane so as to provide entrance and exit areas, said first light-relaying system comprising lens means positioned so as to focus light rays from an object at said object plane substantially at the entrance end of said assembly and light-dispersing means positioned in such fixed spaced relation to said entrance end as to disperse the component wavelengths of said light rays from each different object point into a spectrum of colors in a transverse direction at said entrance end and with each spectrum of such size as to have the component wavelengths thereof impinge upon at least several adjacent light-conducting components, said second light-relaying system comprising lens means focused upon the exit end of said fiber optical assembly and arranged to form an image of light rays transmitted thereby substantially at said final image plane and light-dispersing means so disposed in fixed spaced relation relative to the exit end of said assembly and so oriented relative thereto as to disperse the light rays received from said assembly in such a manner as to recombine said component wavelengths and form an image in full color contrast at said final image plane.

2. An image-transmitting optical system as defined in claim 1 wherein the means for dispersing the light transmitted by at least one of said light-relaying systems comprises a prism.

3. An image-transmitting optical system as defined in claim 1 wherein the means for dispersing the light transmitted by at least one of said light-relaying systems comprises a diffraction grating.

References Cited

UNITED STATES PATENTS

| | | | |
|---|---|---|---|
| 2,818,765 | 1/1958 | Foster | 350—168 X |
| 3,110,762 | 11/1963 | Frank | 350—96 X |
| 3,217,588 | 11/1965 | Chitayat | 350—96 |

JOHN K. CORBIN, *Primary Examiner.*

U.S. Cl. X.R.

350—168